United States Patent
Simburger et al.

(10) Patent No.: US 7,786,716 B2
(45) Date of Patent: Aug. 31, 2010

(54) NANOSATELLITE SOLAR CELL REGULATOR

(75) Inventors: Edward J. Simburger, Agoura Hills, CA (US); Daniel L. Rumsey, Inglewood, CA (US); Peter J. Carian, Inglewood, CA (US)

(73) Assignee: The Aerospace Corporation CA (US)

( * ) Notice: Subject to any disclaimer, the term of this patent is extended or adjusted under 35 U.S.C. 154(b) by 1341 days.

(21) Appl. No.: 11/214,377

(22) Filed: Aug. 29, 2005

(65) Prior Publication Data

US 2007/0044837 A1 Mar. 1, 2007

(51) Int. Cl.
*G05F 1/618* (2006.01)

(52) U.S. Cl. .................. 323/290; 323/906; 320/101; 320/107

(58) Field of Classification Search ......... 323/282–290, 323/222, 225, 275, 906, 907; 136/244, 246, 136/252, 259, 293, 291, 292; 320/101, 104, 320/107, 117, 125
See application file for complete search history.

(56) References Cited

U.S. PATENT DOCUMENTS

| | | | | |
|---|---|---|---|---|
| 5,648,731 A | * | 7/1997 | Decker et al. | 324/767 |
| 6,070,114 A | * | 5/2000 | Fendt et al. | 701/45 |
| 6,262,558 B1 | * | 7/2001 | Weinberg | 320/101 |

* cited by examiner

*Primary Examiner*—Rajnikant B Patel
(74) *Attorney, Agent, or Firm*—Ocean Law; Paul D. Chancellor

(57) ABSTRACT

A solar cell regulator in a nanosatellite includes a pulse width modulated DC-DC boost converter and a peak power tracking controller for converting solar cell power to bus power for charging of system batteries and powering loads while the controller controls the pulse width modulation operation of the converter for sensing solar cell currents and voltages along a power characteristic curve of the solar cell for peak power tracking, for determining any power data point, including a peak power point, an open circuit voltage point, and a short circuit current point along the power characteristic curve of the solar cell, and for communicating the power data to a satellite processor for monitoring the performance of the solar cell during operational use of the satellite.

23 Claims, 2 Drawing Sheets

NANOSATELLITE POWER SYSTEM

NANOSATELLITE POWER SYSTEM

SOLAR CELL REGULATOR

NANOSATELLITE SOLAR CELL REGULATOR

STATEMENT OF GOVERNMENT INTEREST

The invention was made with Government support under contract No. FA8802-04-C-0001 by the Department of the Air Force. The Government has certain rights in the invention.

REFERENCE TO RELATED APPLICATION

The present application is related to U.S. Pat. No. 6,127, 621, issued Oct. 2, 2000, entitled "Power Sphere" and U.S. Pat. No. 6,396,167, B1, issued May 28, 2002, entitled "Power Distribution System".

FIELD OF THE INVENTION

The invention relates to the field of power systems for nanosatellites and picosatelites. More particularly, the present invention relates to solar cell regulators in solar array power distribution systems for small satellites.

BACKGROUND OF THE INVENTION

U.S. Pat. No. 6,127,621 and U.S. Pat. No. 6,396,167-B1, issued to Simburger, teach a distributed power system where a power ring bus is used to connect multiple DC-DC converters in parallel with each DC-DC converter being connected to a solar cell or battery. Each DC-DC converter is supplied with an individual control regulator and supplied current to the bus based upon measurements of bus voltage of the power ring bus. Solar cells are body mounted on the various sides of the picosatellite. The power ring bus architecture solves the problem of obtaining the maximum amount of electric power from a solar array. The solar cell array has multiple panels that are arranged on a surface of the picosatellite. The parallel-connected regulators each include a boost converter, a pulse width modulator (PWM), and a voltage comparator circuit for performing the control function of regulating the amount of power to be delivered onto the ring power bus from a solar cell. The distributed power system has a loading problem. As the load increases on the power ring bus, the PWM increases the current output from the solar cell beyond the maximum power point for the solar cell thereby reducing the amount of power delivered to the power ring bus. Without peak power tracking, the regulator control circuit and implementation algorithm causes the output of the regulators to rapidly go to zero.

Another problem with the prior picosatellite distributed power system is an inability of the satellite to ascertain the operation efficiency of the solar cells, which may extend over several years of operation. For example, in a solar storm, solar cells can be damaged by radiation leaving the amount of power generation undetermined in the presence of fixed mission power requirements. Power systems on current satellite use shunt regulators or an unregulated bus to which the solar array is connected. Using an unregulated bus with shunt regulators, it is impossible to obtain the voltage current characteristic from the actual cells on the solar array. As such, the health of the solar array cannot be determined by a central processing system. With a centralized power system, there is usually a single regulator circuit, which controls all of the individual solar cell strings, or in the case of an unregulated bus, all of the solar cells are continuously connected to the bus. Thus, to measure the current and voltage characteristics of the actual solar array, the whole array must be driven from open circuit conditions to short circuit conditions. This is not possible for conventional solar arrays with conventional control architectures. These and other disadvantages are solved or reduced using the invention.

SUMMARY OF THE INVENTION

An object of the invention is to provide a solar cell regulator for peak power tracking of solar cell power.

Another object of the invention is to provide a solar cell regulator for peak power determination of a solar cell.

Yet another object of the invention is to provide a solar cell regulator for open voltage determination of a solar cell.

Still another object of the invention is to provide a solar cell regulator for short circuit current determination of a solar cell.

A further object of the invention is to provide a solar cell regulator for peak power, short-circuit current, and open voltage determination.

Yet a further object of the invention is to provide a solar cell regulator for providing power data communicated to a central processor of a satellite.

Yet a further object of the invention is to provide a solar cell regulator for providing power data to a central processor of a satellite upon request from the central processor.

A solar cell regulator includes a converter for converting solar cell power to bus power and includes a controller for controlling the converter for peak power tracking of the solar cell and for generating solar cell power data. The solar cell power data includes a peak power point, open circuit voltage, and a short circuit current, collectively as power data indicating the health of the solar cell. In the preferred form, the controller can communicate the power data over a ring data bus to a satellite processor for ascertaining the operational health of the solar cell while connected through the regulator to the bus. The satellite processor may further issue periodic requests for power data to the controller for collecting power data upon demand. These and other advantages will become more apparent from the following detailed description of the preferred embodiment.

DETAILED DESCRIPTION OF THE PREFERRED EMBODIMENT

An embodiment of the invention is described with reference to the figures using reference designations as shown in the figures. Referring to the FIG. 1, a nanosatellite power system includes a ring power bus for routing power and preferably includes a ring data bus for communicating data. A load draws power from the ring power bus. A battery charger and regulator is connected between the ring power bus and battery for charging and discharging battery power from and onto the ring power bus as needed. First and second solar cell regulators are connected to the ring power bus for coupling solar power onto the ring power bus. First and second pairs of solar cells are respectively connected to first and second pairs of blocking diodes that are in turn respectively connected to the first and second regulators. The solar cells and the blocking diodes are shown in pairs as is common in solar arrays disposed on orbiting satellites. The nanosatellite power system can include any number of solar cells and parallel strings of solar cells in the solar cell array.

Figure 1:
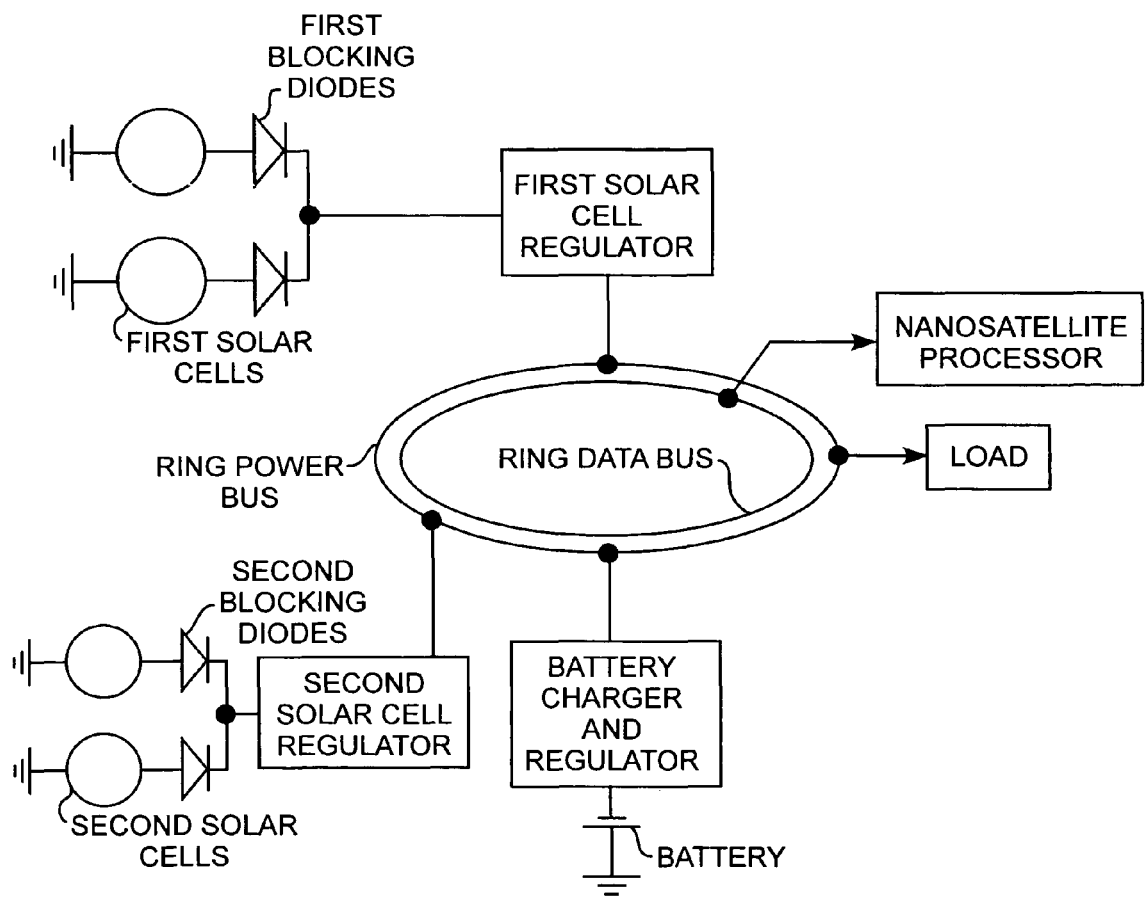
FIG. 1 is a block diagram of a nanosatellite power system.
Figure 2:
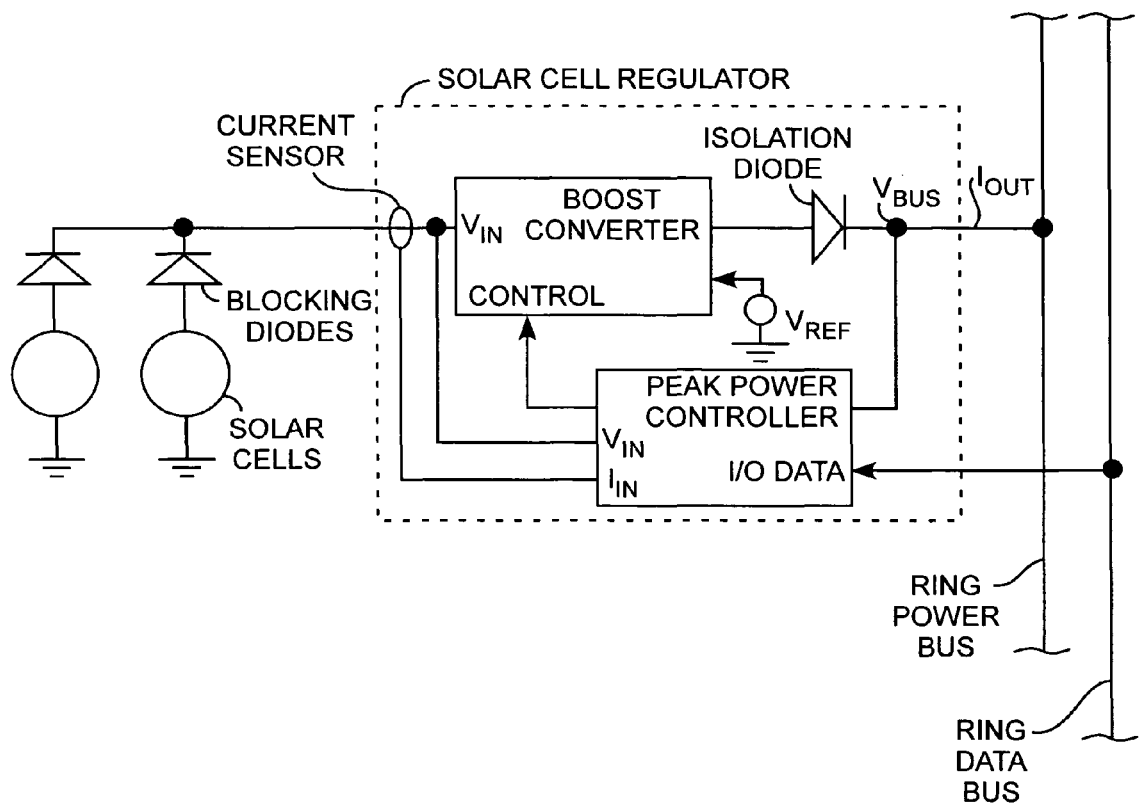
FIG. 2 is a block diagram of a solar cell regulator.

Referring to FIGS. 1 and 2, and more particularly to FIG. 2, a solar cell regulator includes a peak power controller and a DC-DC boost converter. The boost converter is coupled to the ring power bus for coupling solar power from the solar cells onto the ring power bus. An isolation diode in the regulator isolates bus power from the converter, as is common practice so that output current Iout from the regulator flows towards the ring power bus. An input current sensor measures Iin from the solar cells. The controller senses the input current Iin. The input current Iin has an associated input voltage Vin. The controller senses the input voltage Vout. An output current sensor measures the output current Iout that is sensed by the controller. The output current Iout is conducted to the ring bus having an associated output bus voltage VBus that is also sensed by the controller. The converter can drive the VBus ring bus voltage of the ring power bus through an isolation diode. The isolation diode provides isolation from the bus in the event of a catastrophic failure in an individual regulator. Thus, the output of an individual regulator can be driven to zero volts without causing the voltage on the ring power bus to drop to zero. Parallel-connected regulators and battery regulators can be used to maintain bus voltage and continue to supply power to the load.

The converter compares a reference voltage VREF to the bus voltage VBus for generating an error signal used to pulse width modulate (PWM) a pulse width modulation signal within the converter for controlling the amount of power coupled to the bus. The input current sensor senses input current Iin from the solar cells also providing an input voltage Vin to the regulator. During normal operation, the pulse width modulation is varied so that input power (Vin)(Iin) equals the output power (VBus)(IOut). The peak power controller senses the input current Iin and the input voltage Vin. The peak power tracker then provides a control signal to the converter. The control signal is for controlling the pulse width modulation and, hence, the input power and output power so as to track maximum peak power generation of the solar cells. The peak power controller performs peak power tracking. The peak power tracking is used to obtain power data accurately indicating the state of the health of operation of the solar cells or the health of an array of cells deployed satellite on orbit.

The peak power controller generates and adjusts the control signal to vary the duty cycle of the pulse width modulated signal so as to vary the input voltage Vin and input current Iin over an operational range for determining the peak power operating point. The controller can then control the converter to operate at the peak power point so that peak power from the solar cells is delivered onto the ring power bus. By varying the duty cycle, the controller can also sense Vin while controlling the converter to put the solar cells into a short circuit condition for determining the short circuit current of the solar cells. By varying the duty cycle, the controller can also sense Iin while controlling the converter to put the solar cells into an open-circuit condition for determining the open circuit voltage of the solar cells. The peak power point, short circuit current, and open circuit voltage are power data indicating the health of the solar cells. The controller can then communicate the power data to the nanosatellite processor. The controller could as well function as a slave device to the processor by generating and communicating the power data to the processor in response to requests from the processor to the solar cell regulator. In this manner, the processor can determine the health of the solar cells for management of power resources during operational use.

The regulator has been improved to add more capability for power management. The peak power controller controls the DC-DC boost converter and implements a peak power-tracking algorithm. Two different preferred peak-power-tracking algorithms may be used among many well-known peak-power-tracking algorithms. The first preferred peak-power-tracking algorithm periodically determines the peak power voltage of the solar cells. Once the peak power voltage is determined, and then the peak-power-tracking algorithm compares the input voltage from the solar array with a value of a predetermined peak power voltage. This peak power voltage value can be supplied by the processor and communicated to the controller during operational use. When the input voltage Vin drops below the predetermined peak power voltage, then the peak-power tracker controls the DC-DC boost converter to modulate the PWM signal to reduce current demand on the solar cell. This peak power function prevents the PWM signal from increasing solar cell current beyond the peak power operating point of the solar cell. The peak power tracker provides for orderly increases or decreases of input power from the solar cells that may be due to changes in the intensity of the sunlight.

The second preferred peak-power-tracking algorithm is used to measure the input voltage Vin and input current Iin being supplied by the solar cells. These Vin and Iin values and the power product (Vin)(Iin) values can be stored in a memory, not shown, in the controller. This second peak-power-tracking algorithm is repeated continuously with the measured Vin and Iin values for at least two consecutive iterations stored in the memory at all times. The most recent Vin and Iin sensed measurements are compared with the prior measurements to determine when an increase in current demand by the DC-DC converter results in a decrease in power being supplied by the solar cells. When an increase in current demand by the DC-DC converter results in a decrease in power being supplied by the solar cells, then the peak-power controller sends a control signal to the DC-DC converter to control the PWM signal to reduce current demand on the solar cell. The peak power tracking function prevents the PWM signal from increasing solar cell current beyond the peak power operating point of the solar cell. The peak power controller provides for orderly increase or decrease of power output from a solar cell due to changes in the intensity of the sunlight.

For operation in the sunlight portion of the orbit, a first level of control is the PWM of the DC-DC boost converter, which provides a regulated bus with regulated voltages typically between 9.5 and 10.5 volts. The PWM DC-DC converter could increase the current demand on the solar array beyond the peak power point. When the current demands exceed the peak power point, the power output of the converter would collapse to zero. To prevent a power collapse to zero from happening, the controller also monitors the bus voltage VBus and output current IOut and invokes the peak power-tracking algorithm. Thus, when an increase in current demand from the PWM DC-DC converter results in a decrease in power output, the controller commands converter to draw less current from the solar cells. The controller also monitors the solar array voltage Vin and turns the PWM DC-DC converter off when the solar array voltage drops below a predetermined voltage, such as 3.0 volts. The controller turns the converter back on through PWM control when the voltage exceeds 3.2 volts.

An additional benefit of the regulator is the ability to directly measure the Iin current and Vin voltage characteristic of the individual solar cells or string of solar cells being controlled by the regulator. The voltage current characteristic is obtained by having the controller provide the control signal to the converter for controlling the duty cycle of the PWM signal, which causes the PWM signal to demand zero current from the solar cell. Next, the controller measures the input voltage from the solar cell and verifies that zero current is being delivered to the DC-DC converter. Next, the controller controls the PWM signal to increase the current from the solar cell from zero to a maximum in small increments. At each current increment, the controller records the Vin voltage and Iin current output form the solar cells. By continuing to record power points from zero to the maximum current demand, the current and voltage characteristic of the solar cells is effectively measured. The power data can thus include the current and voltage characteristic curve that will indicate the peak power point as well as providing open circuit voltage and short circuit power data. The power data is useful in determining the health of the solar array and can be used to determine the amount of degradation of each part of the solar array that has been experienced over the mission lifetime of the nanosatellite. The power data can also be used to verify and update degradation models, which are used to predict the useful remaining life for the particular satellite. The communication of data on the ring power bus enables the processor to request the controller to place the solar cell at any one power point along the power characteristic curve of the solar cell. The communication of data on the ring power bus enables the controller to communicate any one power point along the power characteristic curve of the solar cell to the processor. The communication of data on the ring power bus enables the controller to interrupt the processor during critical power events. The communication of data on the ring power bus and the ability to control the input voltage and input current for measuring points along the power characteristic curve enables the processor to determine the health of the solar cell array.

Each of the regulators preferably has a microprocessor-based peak power controller and the DC-DC boost converter. One or more regulators may be used for a solar array. For example, the solar array may have four solar cells connected in series to form a solar cell string. The string may be connected to a respective solar cell regulator. Two series connected solar cell strings may then be connected in parallel as a dual string array. Each dual string array may be connected to respective solar cell regulators. Two of these dual string arrays may be respectively disposed on two opposing faces of the nanosatellite. The entire solar cell array of two dual string arrays may be connected to a single solar array regulator.

The invention is directed to a regulator preferably for solar cells disposed on small satellites for maximizing the power output of multiple solar array panels, each of which may be operating at different temperatures and have different orientations with respect to the sun. The regulator implements a peak-power-tracking algorithm preferably in a controller to automatically provide peak power output of the solar arrays to a power bus under all conditions. The regulator preferably includes a controller that communicates power data to a satellite processor for power management. Those skilled in the art can make enhancements, improvements, and modifications to the invention, and these enhancements, improvements, and modifications may nonetheless fall within the spirit and scope of the following claims.

What is claimed is:
1. A nanosatellite solar cell regulator comprising,
a nanosatellite,
a regulator for peak power tracking of a solar cell, the regulator disposed between the solar cell and a nanosatellite ring power bus,
the regulator comprising,
an input current sensor for measuring an input current Iin from the solar cell,
a boost converter for receiving an input voltage Vin at the input current Iin from the solar cell providing input power (Vin)(Iin), the regulator providing an output current Iout, the regulator converting the input power to output power (VBus)(Iout) where VBus>Vin, the output power is communicated onto the ring power bus via an isolation diode between the boost converter and a VBus measuring device, the ring power bus having an output bus voltage VBus, the solar cell having a peak power point, and
a controller for monitoring the input power and for controlling the boost converter for providing the peak power output of the solar cells.
2. The device of claim 1 wherein,
the solar cell is a string of series connected solar cells.
3. The device of claim 1 wherein,
the solar cell is an array of solar cells.
4. A nanosatellite solar cell regulator comprising,
a nanosatellite,
a regulator for peak power tracking of a solar cell, the regulator disposed between the solar cell and a nanosatellite ring power bus, the regulator for providing power data of the solar cell to a nanosatellite processor through a ring data bus, the regulator comprising,
an input current sensor for measuring an input current Iin from the solar cell providing an input voltage Vin,
an output current sensor for measuring an output current Iout of the power bus having a bus voltage VBus,
a boost converter for receiving an input voltage Vin and input current Iin from the solar cell providing input power (Vin)(Iin), the regulator providing an output current Iout, the regulator converting the input power to output power (VBus)(Iout) where VBus>Vin, the output power conducted to the ring power bus, the output power is communicated onto the ring power bus via an isolation diode between the boost converter and a VBus measuring device, the ring power bus having an output bus voltage VBus, the solar cell having a peak power point, the solar cell having an open circuit voltage, the solar cell having a short circuit current, the solar cell having a power characteristic curve comprising the peak power point and the short circuit current and the open circuit voltage, and
a controller for monitoring the input power and for controlling the boost converter for providing peak power output of the solar cell, the controller reducing the output power when the peak power point is exceeded, the controller monitoring the input power for determining power data comprising the peak power point, the controller for communicating the power data to the nanosatellite processor, the power data comprising a data point on the power characteristic curve.
5. The device of claim 4 wherein,
the power data comprises the peak power point and the open circuit voltage and the short circuit current.
6. The device of claim 4 wherein,
the solar cell is a string of series connected solar cells.
7. The device of claim 4 wherein,
the solar cell is an array of solar cells.
8. The device of claim 4 wherein,
the boost converter compares a reference voltage to VBus for determining an error signal, and the boost converter modulating a pulse width modulation signal by the error signal for converting input power into output power at the peak power point.

9. The device of claim 4 wherein,
controller controls the boost converter to reduce the input current Iin to zero for determining the open circuit voltage, and
the power data comprises the open circuit voltage.

10. The device of claim 4 wherein,
the controller controls the boost converter to short circuit the input voltage Vin for determining the short circuit current, and
the power data comprises the short circuit current.

11. The device of claim 4 wherein,
the boost converter compares a reference voltage to the bus voltage VBus for determining an error signal,
the boost converter modulating a pulse width modulation signal by the error signal for converting the input power into the output power, and
the controller controlling the pulse width modulation to a plurality of power points of the input power between an open circuit and a short circuit of the power characteristic curve.

12. The device of claim 4 wherein,
the boost converter compares a reference voltage to the bus voltage VBus for determining an error signal,
the boost converter modulating a pulse width modulation signal by the error signal for converting input power into output power,
the controller controlling the pulse width modulation to a plurality of power points of the input power between an open circuit and a short circuit of the power characteristic curve, and
the power data comprises a plurality of data points on the power characteristic curve.

13. The device of claim 1 wherein,
the nanosatellite comprises a battery,
the ring power bus is coupled to the battery, and
the solar cells charges the battery through the regulator and ring power bus.

14. The device of claim 1 wherein,
the data bus is a ring data bus, and
the power data is communicated onto the ring data bus of the nanosatellite, the ring data bus being connected to the nanosatellite processor.

15. The device of claim 4 wherein,
the nanosatellite processor commands the controller to open circuit the solar cell for determining an open circuit voltage point along the power characteristic curve.

16. The device of claim 4 wherein,
the nanosatellite processor commands the controller to short circuit the solar cell for determining a short circuit current point along the power characteristic curve.

17. The device of claim 1 wherein,
the nanosatellite processor communicates a request for power data to the controller.

18. The device of claim 1 wherein,
the nanosatellite processor communicates a request for power data to the controller, and
the controller communicates power data to the processor.

19. The device of claim 1 wherein,
the nanosatellite processor communicates a request for power data to the controller, and
the controller communicates power data to the processor, the power data comprising power points along the power characteristic curve.

20. A method of operating an electric power system for a nanosatellite comprising the steps of,
providing a nanosatellite and a nanosatellite ring power bus electric power distribution system,
determining a reference voltage corresponding to a maximum power point from a solar cell power source including one or more solar cells,
supplying power from the solar cell power source to a boost converter,
boosting the voltage of the supplied power in the boost converter,
supplying power from a boosted voltage power output of the boost converter to the nanosatellite ring power bus, and
controlling the boost converter to reduce the power supplied by the solar cell power source when the corresponding solar cell power source voltage falls below the reference voltage.

21. The method of claim 20 further including the steps of,
short circuiting the solar cell power source by operation of the boost converter in a short circuit mode, and
preventing overloading the ring power bus by providing an isolation diode between the boost converter and the ring power bus.

22. A method of operating an electric power system for a nanosatellite comprising the steps of,
providing a nanosatellite and a nanosatellite ring power bus electric power distribution system,
supplying power from the solar cell power source to a boost converter,
boosting the voltage of the supplied power in the boost converter,
supplying power from a boosted voltage power output of the boost converter to the nanosatellite ring power bus, and
controlling the boost converter to reduce the power supplied by the solar cell power source when a commanded power increase results in a lower power output.

23. The method of claim 22 further including the steps of,
short circuiting the solar cell power source by operation of the boost converter in a short circuit mode, and
preventing overloading the ring power bus by providing an isolation diode between the boost converter and the ring power bus.

* * * * *